Patented June 28, 1932

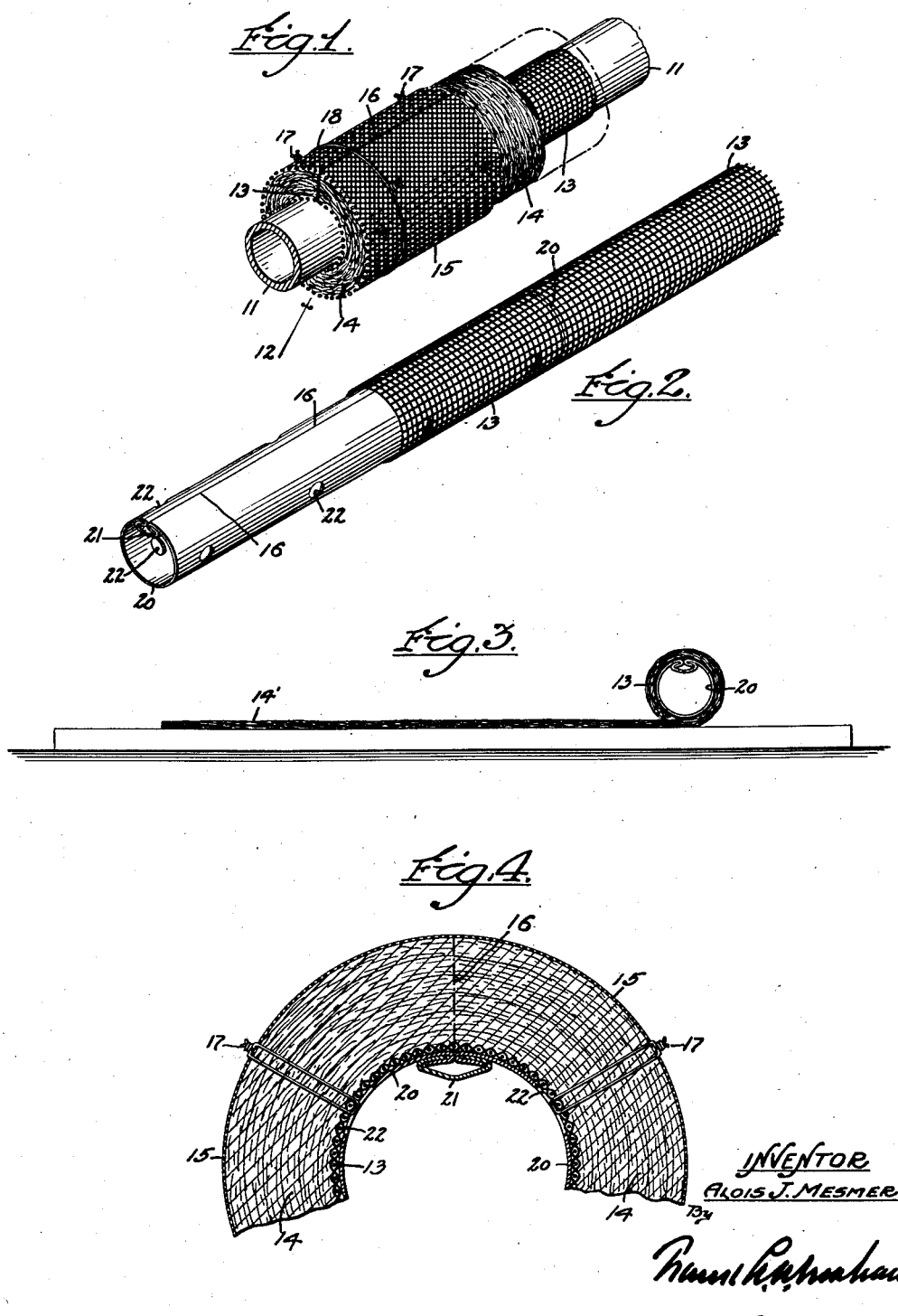

1,864,923

UNITED STATES PATENT OFFICE

ALOIS J. MESMER, OF HUNTINGTON PARK, CALIFORNIA

METHOD OF MAKING PIPE INSULATION

Application filed March 14, 1930. Serial No. 435,755.

This invention has to do with insulation and is more particularly related to insulating material such as is used in covering pipes. It is well known to those familiar with the art that insulated pipes are usually covered with asbestos or some similar insulating material which may be wound about the pipe, or which in some cases is made in the form of pre-cast segmental cylindrical blocks which are retained upon the pipe in any suitable manner and are provided with a covering material to protect them and hold them in place. It is also well known to those familiar with the art that the material commonly known as mineral wool, in view of its very porous character and its natural non-conductive properties, forms a much more efficient insulation than asbestos of the type referred to above, or the pre-case block which may be formed of diatomacious earth or some like material. For this reason various attempts have been made to produce a pipe covering in which the insulating component is composed of mineral wool.

One form of this insulation with which I am familiar consists of two retaining members which lie in flat parallel planes and one of which is provided with a plurality of spaced indentations or grooves adapted to permit the entire member or any predetermined section thereof being curved about a cylindrical member, such as a pipe. The insulating material, consisting of a comparatively thick sheet of mineral wool, is positioned between the two retaining members, which in most cases are composed of wire screen or expanded metal. Due to the friability of mineral wool, pipe insulation of the class last referred to, has not proved satisfactory. It is extremely difficult to handle and ship and a great deal of the insulating material is lost during its installation.

It is the primary object of this invention to produce an insulating unit which is especially adapted for use in covering pipe and which, after it has been formed, has a cylindrical shape, the internal diameter being such that it will accommodate the size pipe for which the particular unit was designed. The insulating unit contemplated by this invention consists, in a general way, of two cylindrical radially spaced retaining members which may be composed of any suitable material, such as screen or expanded metal, and an insulating member interposed between the two retaining members. In the preferred form of my invention the insulating member consists of a blanket or a series of blankets of mineral wool, which are wrapped about the inner retaining member and the two retaining members are tied to each other and to the insulating member by means of ties, which may be in the form of wire locks or staples extending through both retaining members and the insulating member. The unit, after it has been formed, is slotted on one side to permit its installation on a pipe and the natural resilience in the two retaining members is sufficient to maintain the shape of the unit and to hold the same upon the pipe. In actual practice I consider it preferable to secure the insulating members upon a pipe by means of wire or other suitable means, and in the event the material is to be exposed to the weather, the outer retaining members may be covered with any well known weather proofing material.

It is a further object of this invention to produce a novel method whereby the insulating units described above, may be easily and economically manufactured. The details in the construction of a preferred form of unit contemplated by this invention, together with the details in the procedure followed in practicing the method contemplated by this invention, will be best understood from the following description of the accompanying drawing, which is chosen for illustrative purposes only, and in which Fig. 1 is a perspective view with parts broken away to show the construction of a preferred form of insulating unit, and illustrates the same as being installed upon a pipe;

Fig. 2 is a perspective view showing a preferred form of core member which is used in the practice of the method contemplated by this invention and illustrates the manner in which this core member is used in connection with the inner retaining member;

Fig. 3 is an elevational view illustrating one step in the method contemplated by this invention; and Fig. 4 is a sectional elevation showing the unit immediately after it has been formed and before the core member or mandrel has been removed therefrom.

More particularly describing the invention as herein illustrated, reference numeral 11 indicates a pipe which is enclosed within an insulating unit, generally indicated by reference numeral 12. The insulating unit 12 consists of an inner retaining member 13, an insulating member 14, and an outer retaining member 15. The unit formed by these three members is cylindrical in shape and one side thereof is split as indicated by reference numeral 16, to facilitate its placement upon a pipe. The retaining members 13 and 15 are held in fixed relation with respect to the insulating member 14 by means of tie members, indicated by reference numeral 17. After the unit has been installed upon the pipe 11, it may be retained thereon by means of the retaining wire indicated at 18.

As pointed out above, I prefer to form the insulating member 14 by wrapping a blanket of mineral wool around the inner retaining member 13. It is well known to those familiar with the manufacture of mineral wool, that the material is formed by subjecting a stream of molten slag to the action of an air or steam blast, which projects the material in fine fibres into a receiving chamber. In forming the blanket which is indicated in the drawings by reference numeral 14', a conveyor belt is advanced slowly through the bottom of the chamber referred to above, and the fine mineral fibre settles upon this conveyor belt, forming a thick mat of mineral wool fibre. The fibres all run longitudinally of the mat, and for the most satisfactory results I find it highly desirable that the fibres remain in the position in which they fall while the blanket is being formed. The blanket is, therefore, formed by subjecting the thick mat of fibre to a rolling action after it has been removed from the chamber. This rolling action compresses the mat to form a blanket of say ½" or ¼" in thickness. The procedure followed in forming the insulating unit from a blanket of the class described above, consists generally of wrapping or rolling a blanket of the material upon the inner retaining member 13 until an insulating section 14 of the desired thickness has been produced. The insulating member 14 is then surrounded by the outer retaining member 15 and after the tying members 17 have been inserted, the entire unit is split as indicated at 16, for the purpose pointed out above.

Since the inner retaining member 13 is usually made of a very light wire screen, I consider it preferable in order to facilitate the rolling of the insulating blanket 14' thereon, to employ a hollow rigid core member, such as is indicated by reference numeral 20. The core member 20 is shown as being formed of sheet metal bent into a cylindrical shape and retained in such shape by means of a clamp, indicated generally by reference numeral 21. It will be understood that the outer diameter of the core member 20 is substantially equal to that of the pipe upon which the insulating unit is to be used, and if desired, the inner retaining member 13 may be cut and formed directly upon the core member 20. It will be noted that the core member 20 is provided with a plurality of apertures, indicated by reference numeral 22, which are adapted to permit the insertion of the tying members 17. Figure 4 clearly illustrates the manner in which the core member 20 is employed in the formation of the insulating unit and shows the tie members 17 as having been inserted through apertures 22.

It will be apparent from the foregoing description that the article contemplated by this invention may be easily handled and shipped without undue loss of material; further, that insulating units may be readily installed upon a pipe and since they are made specifically for pipes of predetermined outer diameter, there is no loss of time experienced during installation for molding the insulating material and properly forming its outer surface. The method contemplated by this invention is extremely simple and can be readily practiced without the use of skilled labor and it is to be understood that the blanket of mineral wool used may be of any preferred thickness and the number of layers may vary according to the conditions under which the insulation is to be used.

It is to be understood that while I have herein described and illustrated one preferred form of my invention and one preferred procedure which may be followed in practicing the method contemplated by this invention, the invention is not limited to the precise terms of the description set forth above, but includes within its scope whatever changes fairly come within the spirit of the appended claims.

I claim as my invention:

1. A method of forming pipe insulation which includes: placing an inner retaining member upon a hollow core having openings therein wrapping a mineral wool blanket upon said inner retaining cylinder; surrounding the wrapped cylinder with an outer retaining member and tying the two retaining members to the blanket by means of wires drawn through the openings in said core.

2. A method of forming pipe insulation which includes: placing an inner retaining member upon a hollow core having openings therein wrapping an inner retaining cylinder with a mineral wool blanket; surrounding the wrapped retaining member with an outer retaining member and tying the two retaining members to each other and to the blanket by means of wires drawn through the openings in said core.

3. A method of forming pipe insulation which includes: placing an inner retaining member upon a hollow core having openings therein; surrounding said inner retaining member with insulating material; covering the insulating material with an outer retaining member; tying the two retaining members to each other and to the insulating member by means of wires drawn through the openings in said core and removing the said core.

4. A method of forming pipe insulation which includes: placing an inner retaining member upon a hollow core having openings therein; surrounding said inner retaining member with insulating material; covering the insulating material with an outer retaining member; tying the two retaining members to each other and to the insulating member by means of wires drawn through the openings in said core, and splitting the unit formed by the two retaining members and the insulating material.

In testimony whereof, I have hereunto set my hand at Los Angeles, California, this 6th day of March, 1930.

ALOIS J. MESMER.